United States Patent
Laux (10) Patent No.: US 7,406,697 B2
(45) Date of Patent: Jul. 29, 2008

(54) SYSTEM AND METHOD INCLUDING A MERGING DRIVER FOR ACCESSING MULTIPLE DATA SOURCES

(75) Inventor: Thorsten Laux, Hamburg (DE)

(73) Assignee: Sun Microsystems, Inc., Palo Alto, CA (US)

( * ) Notice: Subject to any disclaimer, the term of this patent is extended or adjusted under 35 U.S.C. 154(b) by 754 days.

(21) Appl. No.: 09/738,464

(22) Filed: Dec. 13, 2000

(65) Prior Publication Data

US 2001/0004737 A1 Jun. 21, 2001

(30) Foreign Application Priority Data

Dec. 14, 1999 (EP) .................................. 99124939

(51) Int. Cl.
*G06F 9/46* (2006.01)
*G06F 9/54* (2006.01)
*G06F 17/30* (2006.01)

(52) U.S. Cl. ........................ 719/321; 719/328; 707/1; 707/10

(58) Field of Classification Search ................ 395/604, 395/605, 600; 719/321, 328; 707/1, 10
See application file for complete search history.

(56) References Cited

U.S. PATENT DOCUMENTS

| | | | |
|---|---|---|---|
| 5,475,836 A * | 12/1995 | Harris et al. ................. | 395/600 |
| 5,588,150 A * | 12/1996 | Lin et al. ........................ | 707/1 |
| 5,634,053 A | 5/1997 | Noble et al. ................. | 395/604 |
| 5,826,261 A | 10/1998 | Spencer .......................... | 707/5 |
| 5,903,890 A * | 5/1999 | Shoji et al. ...................... | 707/3 |
| 5,913,214 A | 6/1999 | Madnick et al. ............... | 707/10 |
| 5,987,465 A * | 11/1999 | Kleewein et al. .............. | 707/10 |
| 6,026,392 A * | 2/2000 | Kouchi et al. .................. | 707/2 |
| 6,233,584 B1 * | 5/2001 | Purcell ................... | 707/103 X |

(Continued)

FOREIGN PATENT DOCUMENTS

EP 09/18293 A2 5/1999
JP WO 97/33239 * 9/1997

(Continued)

OTHER PUBLICATIONS

Item N: cited by applicant in IDS # 3.*

(Continued)

*Primary Examiner*—Li B Zhen
(74) *Attorney, Agent, or Firm*—Gunnison, McKay & Hodgson, L.L.P.; Forrest Gunnison (57) ABSTRACT

A method enables access of a plurality of data sources by a single access operation where each data source in the plurality of data sources requires a different driver to access the data source so that there is a plurality of different drivers. The method includes using an application programming interface (API) for each driver in the plurality of different drivers. The API is substantially identical for each of the drivers in the plurality of different drivers. A merging driver receives the single access operation, and in response to the single access operation, the merging driver accesses the plurality of different drivers through the API.

14 Claims, 8 Drawing Sheets

U.S. PATENT DOCUMENTS

| | | | |
|---|---|---|---|
| 6,502,088 B1 * | 12/2002 | Gajda et al. | 707/2 |
| 6,523,028 B1 * | 2/2003 | DiDomizio et al. | 707/5 |
| 6,523,035 B1 * | 2/2003 | Fleming et al. | 707/10 |
| 6,792,416 B2 * | 9/2004 | Soetarman et al. | 707/3 |
| 7,113,939 B2 * | 9/2006 | Chou et al. | 707/3 |

FOREIGN PATENT DOCUMENTS

| | | |
|---|---|---|
| WO | WO 90/08360 | 7/1990 |

OTHER PUBLICATIONS

L. Liu, C. Pu, and Y. Lee, "An Adaptive Approach to Query Mediation across Heterogeneous Information Sources," IEEE, pp. 144-156 (1996).

Koh J, et al., "Query Execution Strategies for Missing Data in Distributed Heterogeneous Object Databases", Proceedings of the International Conference on Distributed Computing Systems, IEEE Comp. Soc. Press, vol. Conf. 16, p. 466-473, 1996.

* cited by examiner

SYSTEM AND METHOD INCLUDING A MERGING DRIVER FOR ACCESSING MULTIPLE DATA SOURCES

BACKGROUND OF THE INVENTION

1. Field of the Invention

The present invention relates to the access of a database having multiple data sources, and more particularly, to the access of multiple data sources by a single query.

2. Description of Related Art

There are known databases where the data to be accessed is distributed over multiple data sources, such as different directories, different servers, etc., and where the different data sources have different formats. In this case, in known systems, only one data source can be accessed by a single search or a query. To access multiple sources, the user has to dispatch multiple queries directed to the multiple sources.

SUMMARY OF THE INVENTION

According to an aspect of the present invention there is provided a method for accessing a plurality of data sources by a single access operation or query. Each data source in the plurality of data sources requires a separate driver to access the data source so that there is a plurality of separate drivers. Each driver in the plurality of separate drivers uses an application programming interface (API). The API is substantially identical for each of the drivers in the plurality of separate drivers.

A merging driver receives the single access operation. In response to the single access operation, the merging driver accesses the plurality of separate drivers through the API and consequently accesses each of the data sources. In one embodiment, a user selects each data source to be included in the plurality of data sources.

The provision of the merging driver provides a kind of a "virtual" database, where multiple sources requiring individual drivers are accessed under the roof of a common API. The merging driver uses the common API to access the multiple sources such that the multiple sources can be queried through a single query. An application program or a user interface may access the merging driver through its API to access multiple sources by a single access operation.

The multiple data sources can be databases, which are separate from one another. The multiple data sources may be in different locations, may be different kinds, and may require the use of different query engines to access their data.

A user by a single query (or any other access operation, e.g. for editing) can access data, which may be distributed over multiple sources. By specifying the sources to be accessed, a user can "merge" different sources into a "virtual" database, which looks to the user like a single database, but which is actually a grouping of several databases or sources selected by the user, so that a single query can provide the user with results, which are retrieved from different sources.

BRIEF DESCRIPTION OF THE DRAWINGS

In the drawings and the detailed description that follows, elements with the same reference numeral are the same element. Also, the first digit of a reference numeral for an element indicates the first drawing in which that element appeared.

DETAILED DESCRIPTION

Figure 1:
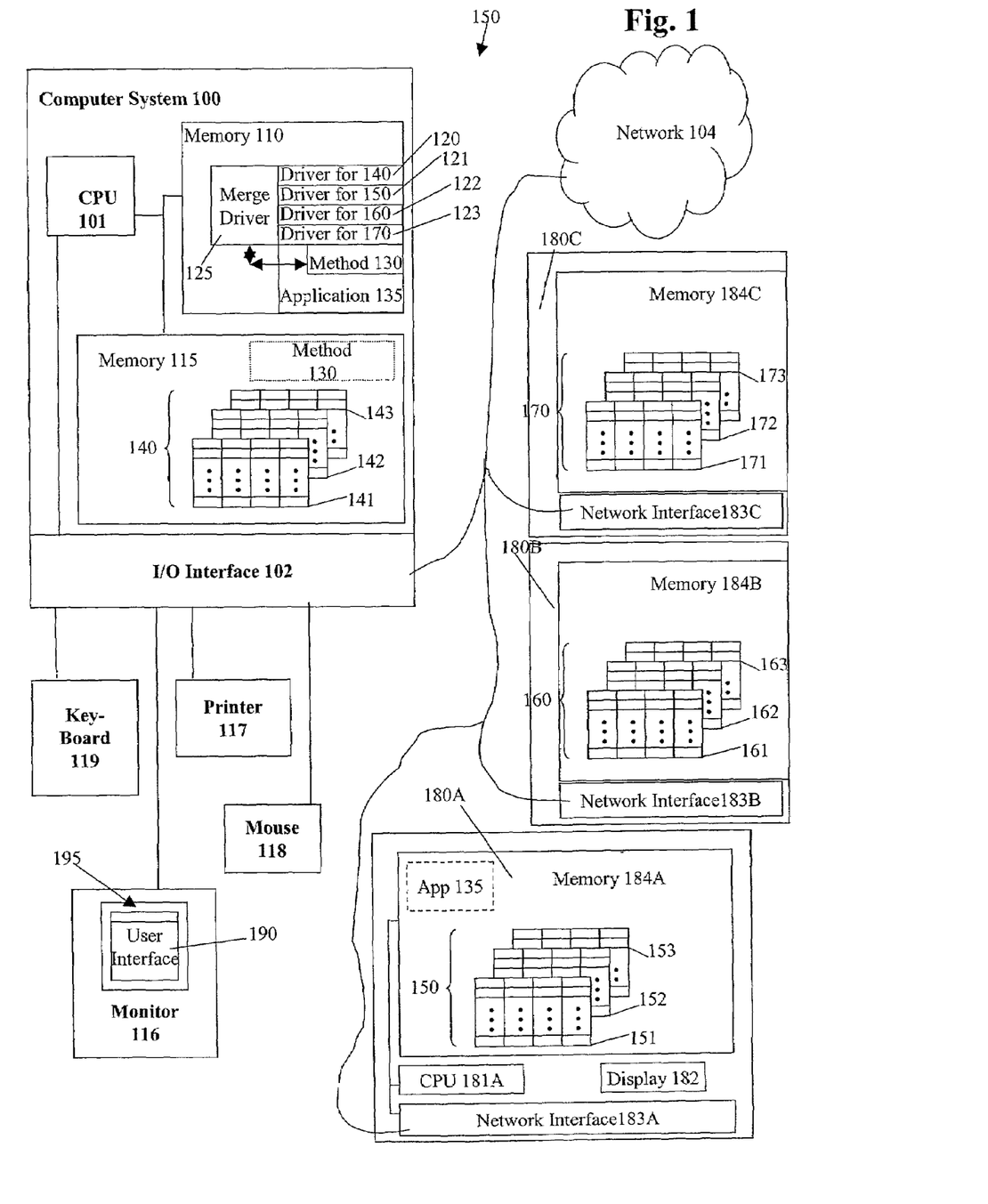
FIG. 1 is a block diagram of a computer system to be used with an embodiment of the present invention.

According one embodiment of the present invention, a method 130 for accessing multiple data sources 140, 150, 160, 170 using a single access operation or query eliminates the prior art need for a user to use multiple queries. Multiple data sources 140, 150, 160, 170 may have different formats and may need to be accessed by different drivers, e.g., drivers 120, 121, 122, and 123, respectively.

As explained more completely below, a common application programming interface (API) is used for individually accessing each of drivers 120 to 123, and consequently data sources 140, 150, 160, and 170. The access to multiple data sources 140, 150, 160, and 170 by a single access operation is achieved using a merging driver 125, which accesses the plurality of data sources 140, 150, 160, and 170 by accessing the corresponding drivers 120 to 123 through the common API.

In other words, for each data source having a different format, there is a corresponding separate driver. Each of this plurality of drivers is accessed through a common API. The merging driver utilizes the common API to access this plurality of data sources.

Thus, merging driver 125 uses the common API to perform access operations to the plurality of data sources 140, 150, 160, and 170 in response to a single access operation to merging driver 125. Merging driver 125, therefore, acts as a generator for generating a plurality of queries, in response to a single query to merging driver 125, to different data sources having different formats or requiring separate drivers for some other reason.

Merging driver 125 provides a "virtual" database, where multiple data sources requiring individually different drivers are accessed under the roof of a common API. Merging driver 125 uses the common API to access the multiple data sources such that they can be queried through a single query. An application program or a user interface may access merging driver 125 through its API to access multiple sources by a single access operation.

From a user's point of view, merging driver 125 is configured such that merging driver 125 looks to the outside world, or better to say to the user interface, like a data source itself.

This means that the user can access merging driver 125 like a single data source. However, this single data source actually is multiple data sources 140, 150, 160, and 170, which are accessed using the single access operation.

In one embodiment, application 135 is an address book of the STAROFFICE Software Package produced by Sun Microsystems, Palo Alto, Calif. Data source 140 is, for example, a lightweight directory access protocol (LDAP) source, which means that the data in this source is stored according to the LDAP format. Hence, driver 120 is a LDAP driver.

Data source 150 has data stored in tables 151 to 152 according to a format specified by a database software application, such as the StarBase database management application that is part of the STAROFFICE Software Package. (STAROFFICE is a trademark of Sun Microsystems, Inc. of Palo Alto, Calif.) Thus, data source 150 is accessed by a different driver 121, which in fact is the driver for the StarBase database management application.

Data source 160 is another source also requiring a driver 122 different from the drivers 120 and 121 for data sources 140 and 150, respectively. Finally, data source 170 is yet another source requiring again a different driver 123. Data source 170, for example, may be the source "SCHEDULE" containing the users, which are registered as users of the STAROFFICE schedule software.

From the perspective of a user interface 190 (FIG. 2), these different drivers can be accessed through a common API. This means that a user can access, through user interface 190, an API, which is the same for all of the different drivers 120 to 123. Thus, there is only one single API through which such an access to the different data sources can be carried out. Based on such a configuration and by further providing merging driver 125, a user can simultaneously access a plurality of different data sources by a single access operation.

Figure 2:
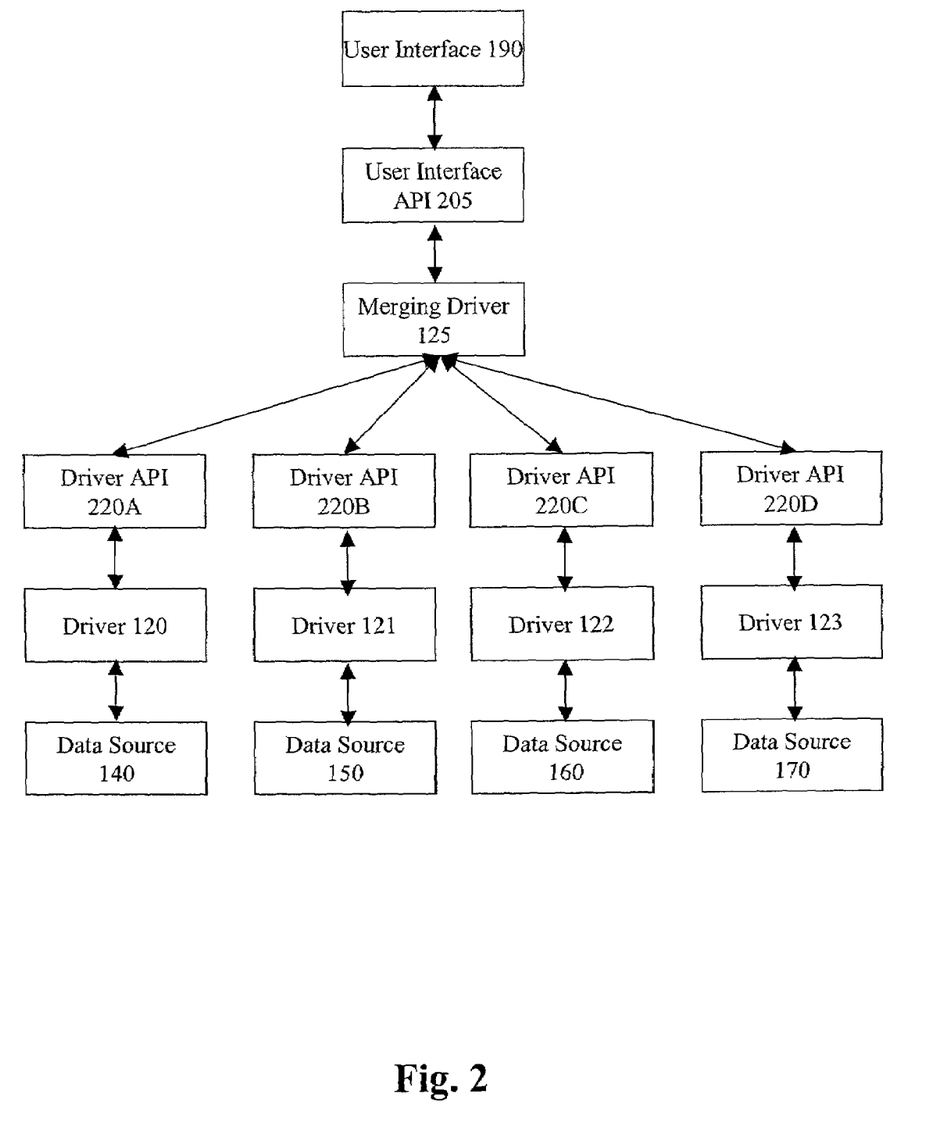
FIG. 2 schematically shows the access to multiple data sources by a single query according to one embodiment of the present invention.

FIG. 2 schematically illustrates how a single access operation (such as a query) from a user interface 190 of an application 135 assesses multiple data sources 140, 150, 160, and 170 as if data sources 140, 150, 160, and 170 were a single source, e.g., a single database. Merging driver 125, which has the task of distributing a query (or any other access operation), receives an access operation from user interface 190 through API 205 of user interface 190.

Merging drive 125 distributes the access operation to each of different drivers 120 to 123 using corresponding driver APIs 220A to 220D, respectively. Each of APIs 220A to 220D is substantially identical, which means that each appears the same to merging driver 125. Thus, merging driver 125 performs a kind of demultiplexing operation for any access operation received by merging driver 125. Any corresponding instruction or sequence of instructions is distributed by merging driver 125 to the different data sources through their corresponding drivers and their common API, as required.

Specifically, each driver API 220i, where i goes from A to D, passes the access operation from merging driver 125 to the corresponding driver, e.g., API 220A passes the access operation to driver 120, that in turn performs the access operation on the data source, e.g., data source 140, for that driver. The driver passes any response to the access operation to the driver API that in turn passes the response back to merging driver 125.

Hence, merging driver 125 generates multiple queries for the individual data sources 140, 150, 160, and 170 by distributing the single query to the different data sources where one query is generated for each of the different data sources 140, 150, 160, and 170 requiring separate drivers. Through the generation of multiple queries and the usage of corresponding multiple drivers, each with a substantially identical API, a query result is obtained and ordered, as described more completely below.

In one embodiment, merging driver 125 is used in connection with an option for autocompletion, which means that after having input only a part of the desired query, the response to the partial query is automatically completed. Such an autocompletion procedure, generally, requires a lot of RAM, and therefore, for example, there may be configured one merging driver for only those data sources for which the autocompletion makes sense. Another merging driver, which works without autocompletion, may be configured for a different combination of data sources.

In case of the above-described "virtual" database, which can be queried by a single query through merging driver 125, being an address book, the user can, based on a single query, generate serial letters or form letters although the data the user needs for generating the serial letters is distributed over multiple data sources actually requiring different drivers.

Merging driver 125 not only may be accessed by a user interface, but also by any application program, which is capable of accessing the API that merging driver 125 offers to the outside world. Such an application program may for example be a word processor, a database program, or any other application program for which it makes sense to access the "virtual database" described hereinbefore. Merging driver 125 can be used not only for distributing a single query to multiple sources, but also for any operation (any access operation) performed on multiple sources, such as updating or editing data in the sources that can be carried out based on a single input access operation.

Figure 3:
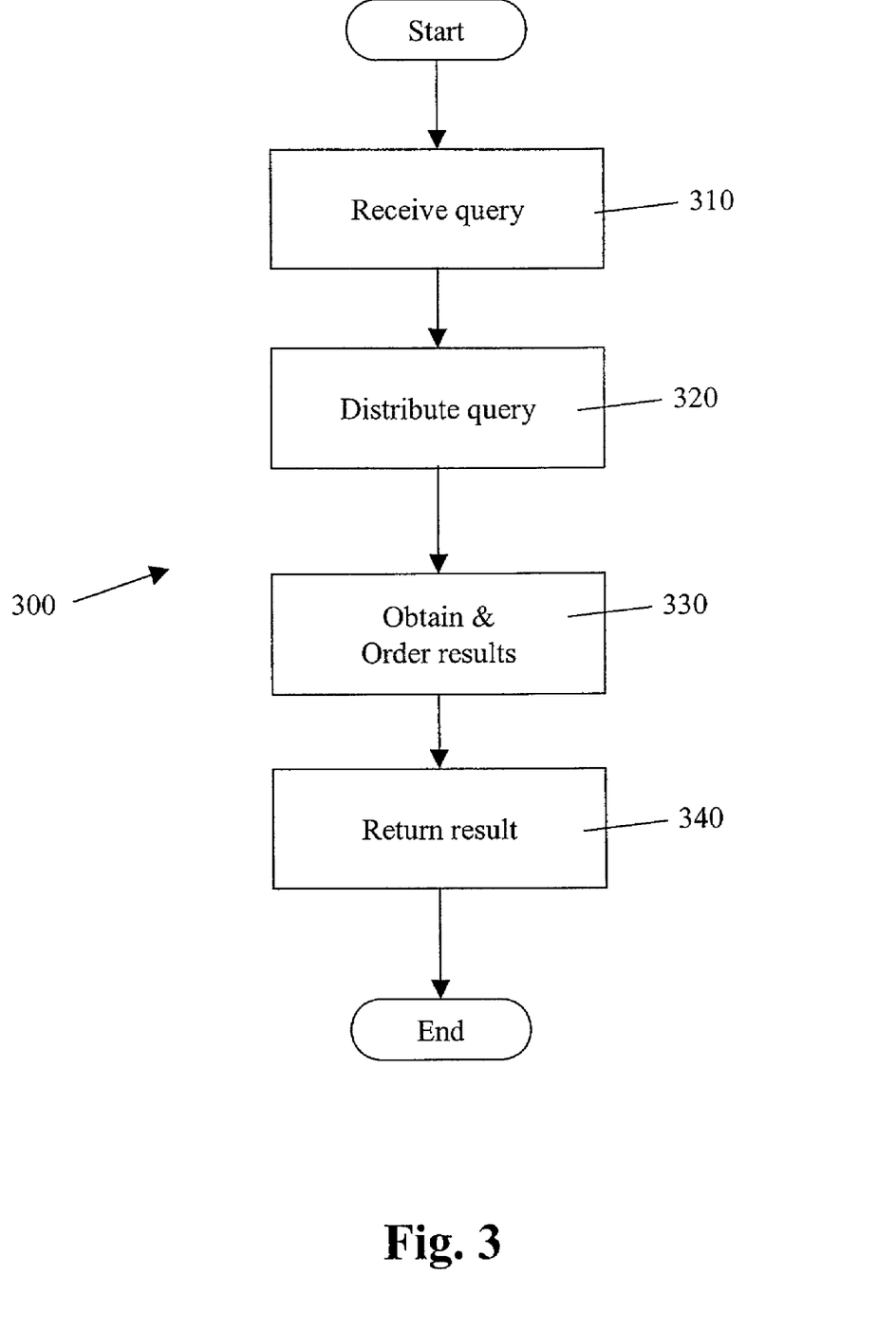
FIG. 3 is a process flow diagram of a method performed using the merging driver according to one embodiment of the present invention.

FIG. 3 is a process flow diagram illustrating the operation, in one embodiment, of merging driver 125. In receive query operation 310, merging driver 125 receives a query (or any other access instruction) from user interface 190, and passes processing to distribute query operation 320.

As explained more completely below, when merging driver 125 receives a query in operation 310, the user has previously configured the virtual database, e.g., data sources 140, 150, 160, and 170, associated with merging driver 125. Consequently, in distribute query operation 320, merging driver 125 converts the query received from user interface API 205 to a plurality of queries that includes a query that can be passed to each of drivers 120 to 123 using driver API 220i. Merging driver 125 sends the query to each driver API 220i and then transfers to obtain and order results operation 330.

The operations performed in obtain and order results operation 330 depend on the query that was received. As is known to those of skill in the art, some queries simply request all data that matches filter criteria, while other queries request that the data that matches the filter criteria be presented in a particular order, e.g., largest to smallest or conversely, alphabetically by string position and so on.

If only the raw results are requested in the query, operation 330 upon receipt of the results from drivers 120 to 123, marshals the results so that the results can be passed via user interface API 205 to application 135. Conversely, if the results must be ordered, operation 330 either obtains the results in an ordered fashion, or orders the results obtained, and then marshals the ordered results for passing to application 135. Operation 330 transfers processing to return result operation 340. Operation 340 outputs the results to user interface 190 of application 135.

Figure 4:
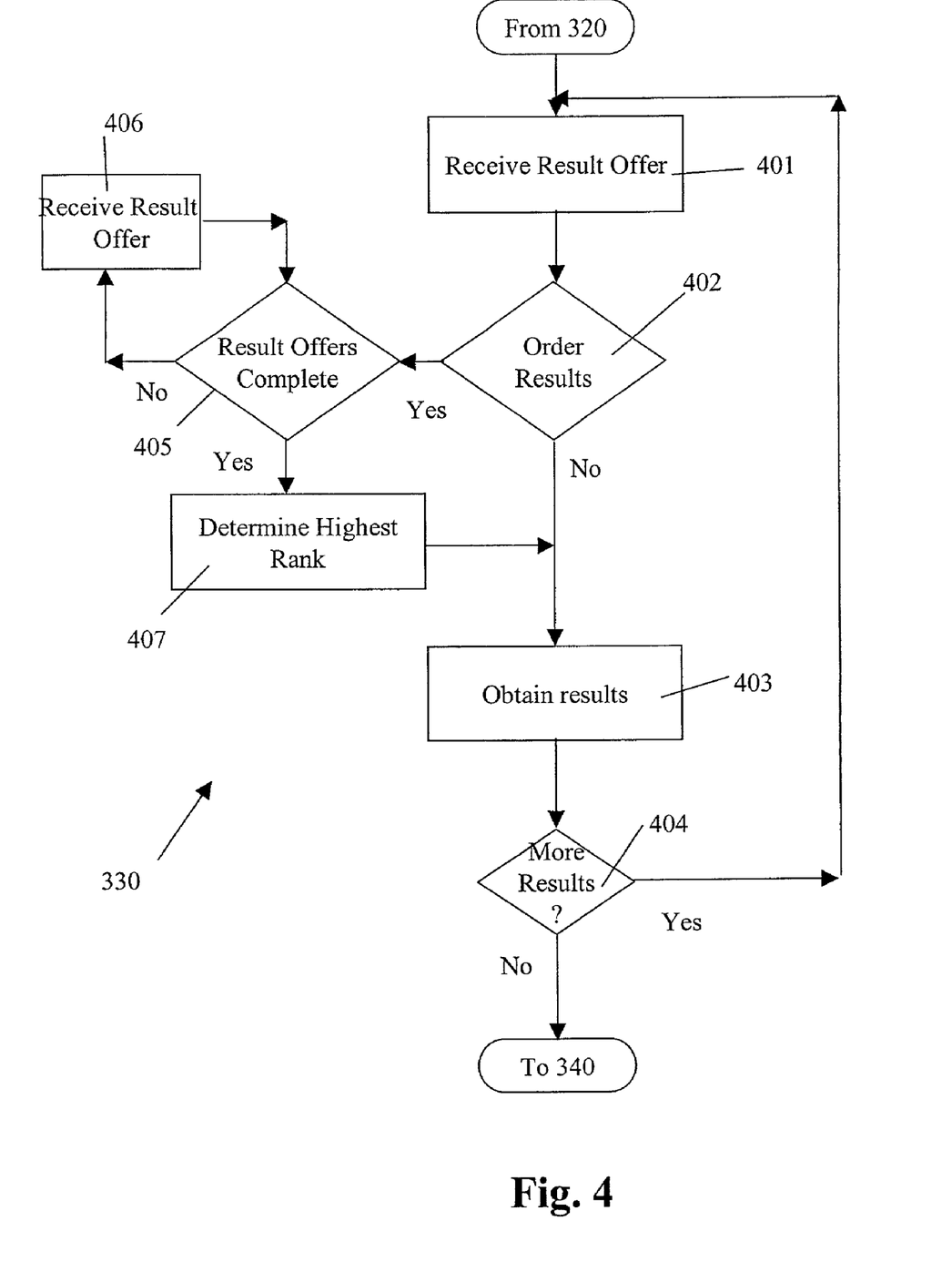
FIG. 4 is a process flow diagram for one embodiment of the obtain and order results operation of FIG. 3.

The specific operations performed in obtain and order results operation 330 can be implemented in a number of different ways. In one embodiment, ordering the results is performed in combination with obtaining the result by obtaining a result from a data source only if that result matches the ordering criterion. If the ordering criterion is "order alphabetically according to title", for example, a result starting with character "B" from one data source is not obtained as long as the other data sources offer higher-ranking results, such as results starting with character "A". FIG. 4 is a process flow diagram for this embodiment of obtain and order results operation 330.

In receive result offer operation 401, a result is offered to merging driver 125 by one of data sources 140, 150, 160, and 170 through its driver 120, 121, 122, and 123, respectively. Merging driver 125 temporarily stores this offer, and transfers to order results check operation 402.

If the access operation to merging driver 125 did not specify that the results be ordered, check operation 402 transfers processing to obtain results operation 403 that is described below, and otherwise transfers processing to result offers complete check operation 405.

Result offers complete check operation 405 determines whether merging driver 125 has received a result offer from each of the data source drivers that still have data responsive to the query. If a result offer has been received from each such data source driver, check operation 405 transfers processing to determine highest rank operation 407, and otherwise transfers processing to receive result offer operation 406.

Processing remains in receive result offer operation 406 until another driver makes a result offer to merging driver 125 and then processing returns to result offers complete check operation 405. Hence, processing transfers between operations 405 and 406 until merging driver 125 receives a results offer from all data source drivers that still have data available that is responsive to the query.

Thus, when processing transfers to determine highest rank operation 407, merging driver 125 determines which of the drivers offers the result that is next in the ordered results. The driver offering the result that is next in the ordered results is identified as the current driver, and processing transfers to obtain results operation 403. Merging driver 125 retains the result offers from the other drivers in this embodiment.

Obtain results operation 403 uses the current driver to obtain the offered result from the data source. Recall that each data source requires a different driver and to obtain data from a different data source, the driver for the different data source must be used.

The result obtained in operation 403 may be returned as an output immediately, e.g., operation 340 is included within operation 330. However, the result also may, be buffered to return a plurality of results simultaneously. In either case, more results check operation 404 determines whether all of the data has been received from each of data sources 140, 150, 160, and 170. If additional data is available, processing returns to receive result offer operation 401 and otherwise to operation 340.

The sequence and number of operations presented in FIG. 4 is illustrative only and is not intended to limit the invention to the sequence shown. Those of skill in the art will appreciate, for example, that receive result operations 401 and 406 may be a single module that is called at appropriate times. Similarly, order results check operation 402 may be performed only once for each query or access operation and not in every loop as illustrated in FIG. 4.

Figure 5:
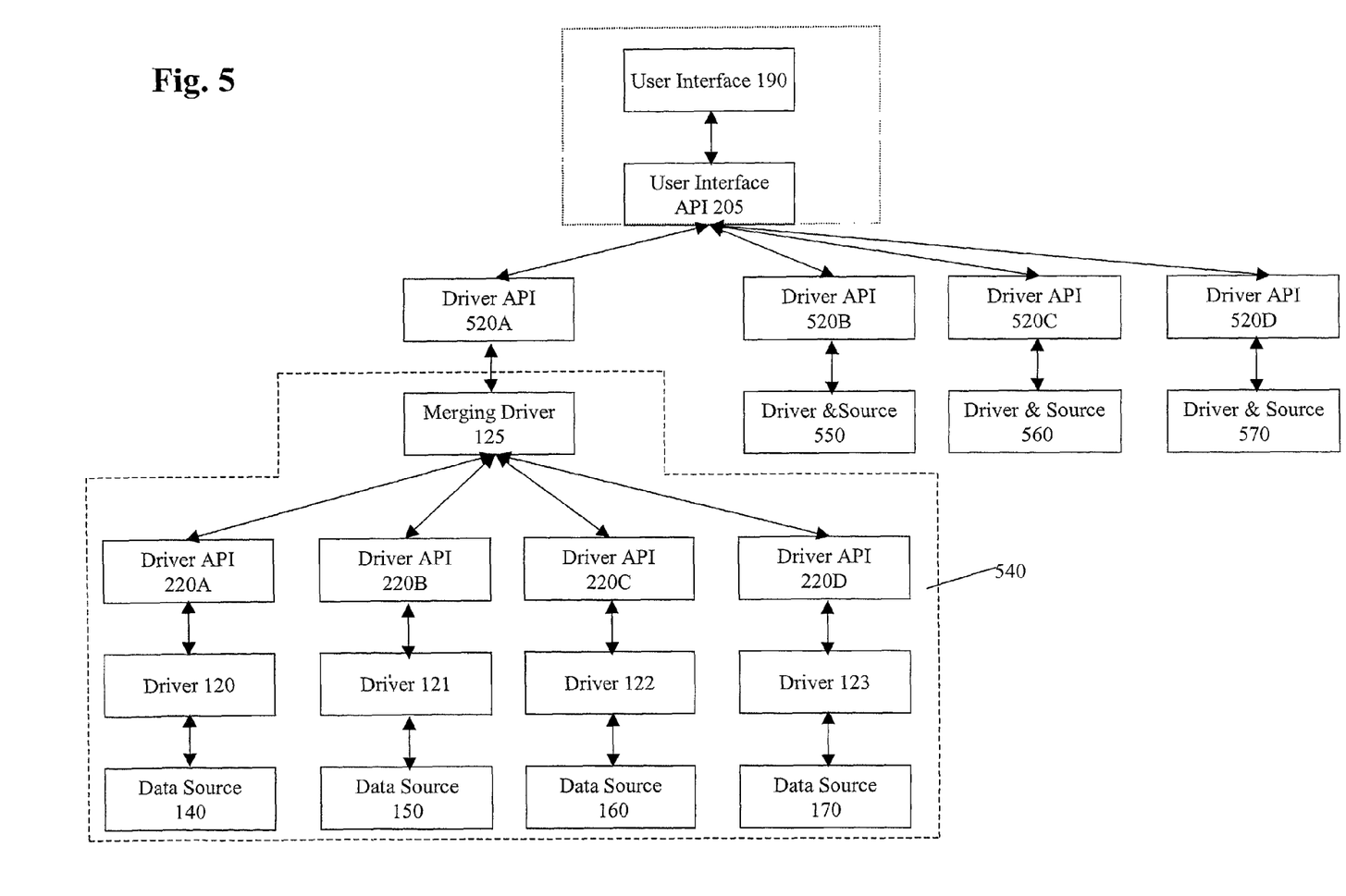
FIG. 5 schematically shows a user's perspective of an access to a plurality of data sources including a merged data source according to one embodiment of the present invention.

In the embodiment, described above, only data sources 140, 150, 160, and 170 that were available through merging driver 125 were considered. However, in a more general configuration, as illustrated in FIG. 5, data sources 140, 150, 160, and 170 appear to user interface 190 as a single source 540 in a plurality of sources 540, 550, 560, and 570. User interface 190 accesses each of sources 540, 550, 560, and 570 through a driver API 520A to 520D, respectively. Each of driver APIs 520A to 520D is substantially identical.

Herein, source 540 is a merging source, which means that an access to source 540 is actually an access to a plurality of different data sources 140, 150, 160, and 170, which are dissimilar. The access to merging source 540 was described above. From the outside world, merging source 540 does not look different from any of the other sources 550, 560, and 570. Hence, to user application 135, merging source 540 is just another source that is available to the user.

Those skilled in the art will readily recognize that with this concept, any or all of sources 550, 560, and 570 may also be merging sources that are different from merging source 540. Therefore, through the concept of the provision of a common API for all of the different drivers, and further through the provision of a merging driver performing a demultiplex operation to distribute a query to the different sources, the grouping of different sources as a "virtual database," which looks from the outside world like a single database, becomes possible in a very easy manner. Moreover, each of the individual sources grouped together in such a "virtual database" may itself consist of a grouping of different sources.

According to an embodiment of the present invention, a merging driver operates on a plurality of differently formatted data sources. Data sources 140, 150, 160, and 170, upon which merging driver 125 operates, may be selected or specified by a user in configuring the merging driver.

Figure 6:
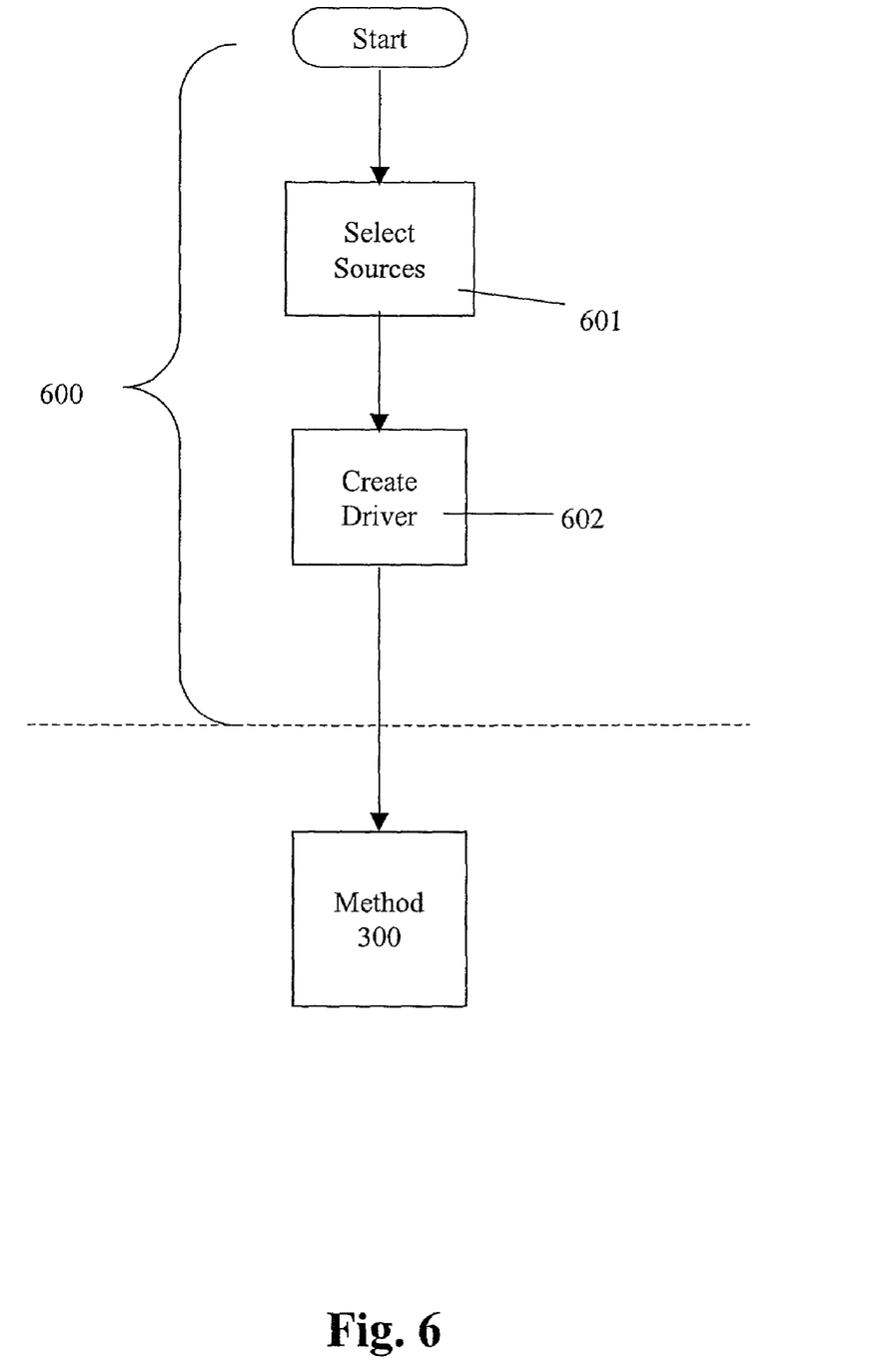
FIG. 6 is a process flow diagram for one embodiment of a method of making and using the merging driver according to one embodiment of the present invention.

FIG. 6 is a process flow diagram for one embodiment of making and using the merging driver according to one embodiment of the present invention. Operation 600 to make merging driver 125, for example, includes two operations, select sources operation 601 and create driver operation 602.

Figure 7A:
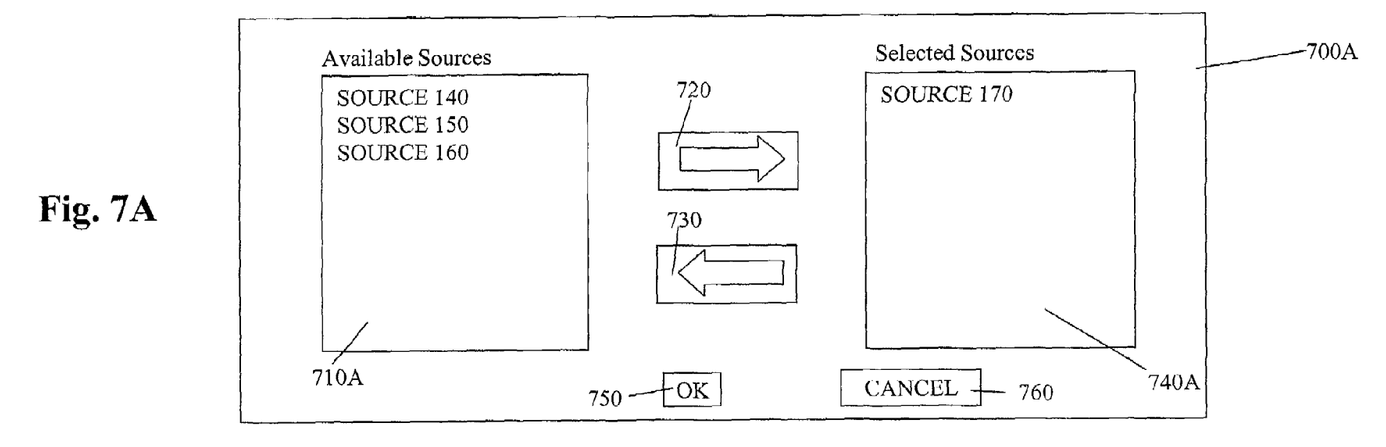
FIG. 7A illustrates a first embodiment of a source selection dialogue window according to one embodiment of the invention.

In select sources operation 601, a merge sources dialogue window 700A is presented to the user on display screen 195 so that the user can select the sources that are to be merged. In this embodiment, merge sources dialogue window 700A, as shown in FIG. 7A, includes an available sources window 710A, and a selected sources window 740A.

All possible sources are listed in available sources window 710A. In this example, the sources of FIGS. 1 and 2 are shown. The user can select a source by highlighting the source in window 710A, and then activating button add 720. This causes the selected source to be moved from window 710A to window 740A. Similarly, the user can remove a selected source by highlighting the source in window 740A and activating button remove 730. This causes the selected source to be moved from window 740A to window 710A, i.e., a selected source is deselected. By activating button OK 750, the user completes select sources operation 601, and selects the sources listed in window 740A.

Figure 7B:
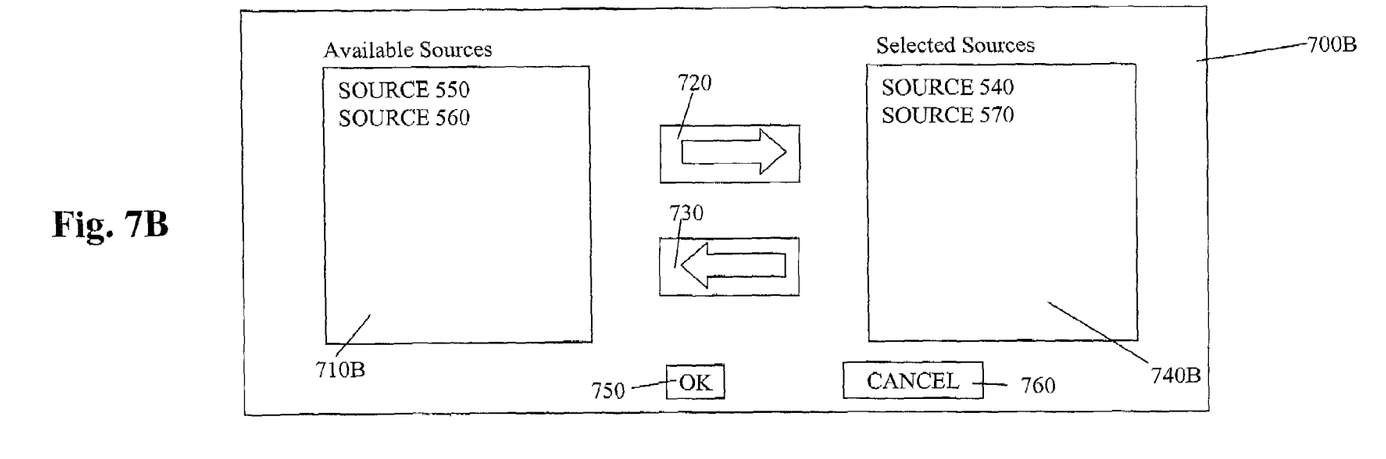
FIG. 7B illustrates a second embodiment of a source selection dialogue window according to one embodiment of the invention.

In FIG. 7B, merge sources dialogue window is presented for the sources of FIG. 5. Note that source 540, which is a merged source as described above, appears as just another source that can be included within another merged source that is being created using operation 601.

Figure 8:
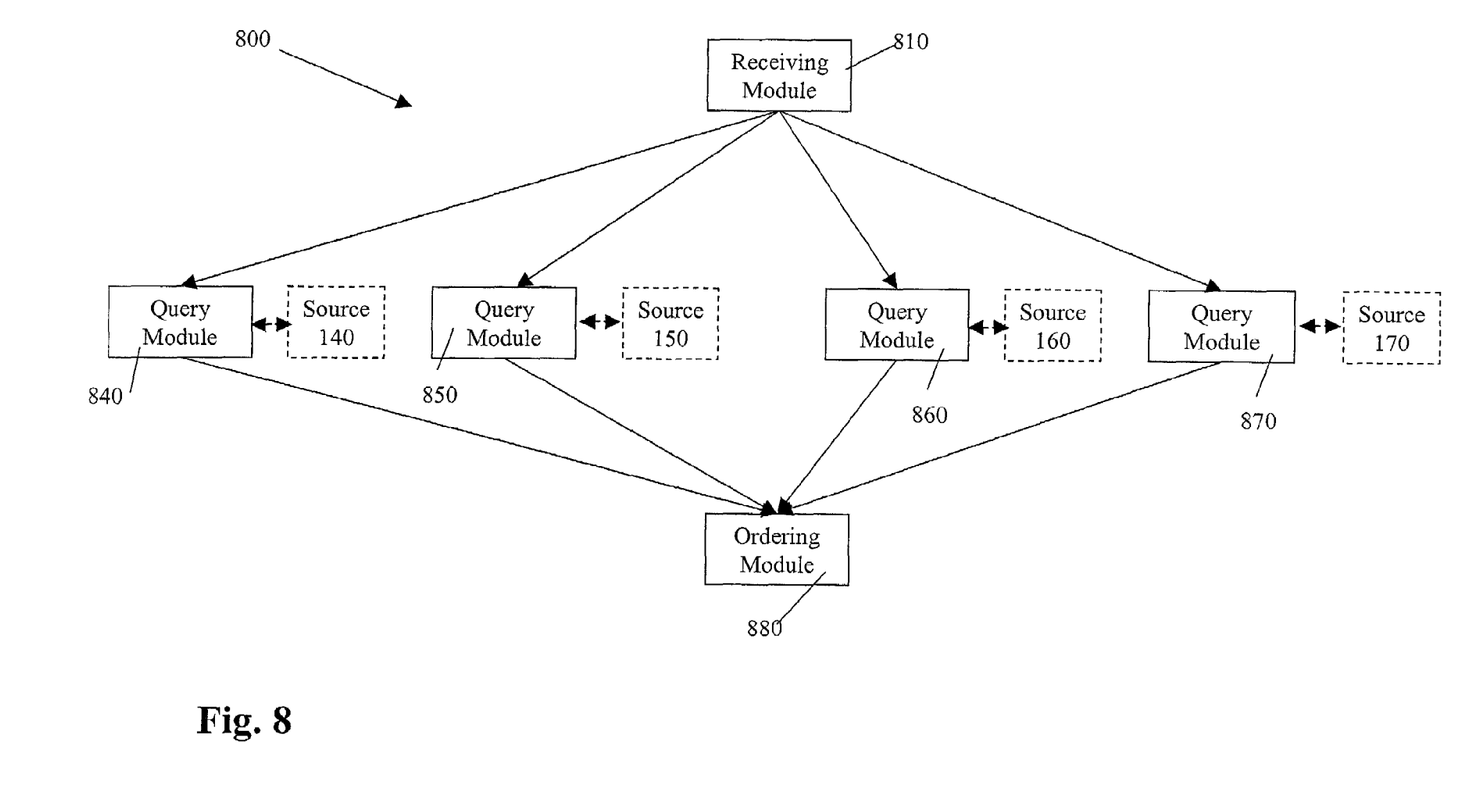
FIG. 8 illustrates the various modules that are generated in making the merging driver of FIG. 1.

Upon completion of operation 601, processing transfers to create driver operation 602. FIG. 8 illustrates a merging driver 800 created in one embodiment of the present invention in accordance with the user's selections for merging driver 125. Each merging driver includes a receiving module 810 for receiving queries or access instructions from a user interface (or any application program). A merging driver includes a different query module for each source selected in operation 601. In this example, four sources were selected so create driver operation 602 uses fours query modules 840, 850, 860, and 870 for sources 140, 150, 160, and 170, respectively.

Each query module receives a query from receiving module 810 and in response to that query, queries the corresponding data source. Each query module provides the query response to ordering module 880. Ordering module 880 orders the results, which are retrieved from different data sources 140, 150, 160, and 170, and returns the ordered results to the user interface.

Merging driver 125, upon creation according to the user's preferences, may be stored and may be given a name chosen by the user. Hence, as illustrated in FIG. 7B, both merging driver 125, and the merged source defined by merging driver 125 are available at any later stage for simultaneous access to the multiple sources for which merging driver 125 has been configured.

Those skilled in the art will readily recognize that the individual operations and elements of the invention, as explained above, can be implemented by a software tool or a computer program. In this case, the operations and elements represent corresponding computer program code portions, which cause the CPU of the computer to execute instructions, which finally represent the corresponding operations or elements of the present invention. It will be understood that the various process flow diagrams represent actions performed by the CPU of a computer in accordance with computer instructions of a software tool or a computer program.

The present invention is applicable to a hardware configuration like a personal computer or workstation as illustrated schematically in FIG. 1 by computer system 100 where all the data sources of interest as well as method 130 are stored on that computer system.

The invention, however, may also be applied to a client-server configuration 150 that also is illustrated in FIG. 1 where the data sources are distributed across a network 104. The access operations may be initiated using client device 100 while some or all operations of method 130 are carried out on a server computer 180A accessible by client device 100 over data network 104, such as the Internet, using a browser application or the like.

Herein, a computer program product comprises a medium configured to store or transport computer readable code for method 130 or in which computer readable code for method 130 is stored. Some examples of computer program products are CD-ROM discs, ROM cards, floppy discs, magnetic tapes, computer hard drives, servers on a network and signals transmitted over a network representing computer readable program code.

As illustrated in FIG. 1, this storage medium may belong to computer system 100 itself. However, the storage medium also may be removed from computer system 100. For example, method 130 and application 135 may be stored in memory 184A that is physically located in a location different from processor 101. The only requirement is that processor 101 is coupled to the memory containing method 130. This could be accomplished in a client-server system 150, e.g. system 100 is the client and system 180A is the server, or alternatively via a connection to another computer via modems and analog lines, or digital interfaces and a digital carrier line.

For example, memory 184A could be in a World Wide Web portal, while display unit 116 and processor 101 are in a personal digital assistant (PDA), or a wireless telephone, for example. Conversely, the display unit and at least one of the input devices could be in a client computer, a wireless telephone, or a PDA, while the memory and processor are part of a server computer on a wide area network, a local area network, or the Internet.

More specifically, computer system 100, in one embodiment, can be a portable computer, a workstation, a two-way pager, a cellular telephone, a digital wireless telephone, a personal digital assistant, a server computer, an Internet appliance, or any other device that includes the components shown and that can execute method 130, or at least can provide the input instructions to method 130 that is executed on another system. Similarly, in another embodiment, computer system 100 can be comprised of multiple different computers, wireless devices, cellular telephones, digital telephones, two-way pagers, or personal digital assistants, server computers, or any desired combination of these devices that are interconnected to perform method 130 as described herein.

Herein, a computer memory refers to a volatile memory, a non-volatile memory, or a combination of the two in any one of these devices. Similarly, a computer input unit and a display unit refer to the features providing the required functionality to input the information described herein, and to display the information described herein, respectively, in any one of the aforementioned or equivalent devices.

In view of this disclosure, method 130 can be implemented in a wide variety of computer system configurations. In addition, method 130 could be stored as different modules in memories of different devices. For example, method 130 could initially be stored in a server computer 180A, and then as necessary, a module of method 130 could be transferred to a client device 100 and executed on client device 100. Consequently, part of method 130 would be executed on the server processor 181A, and another part of method 130 would be executed on processor 101 of client device 100. In view of this disclosure, those of skill in the art can implement the invention of a wide-variety of physical hardware configurations using an operating system and computer programming language of interest to the user. For example, FIG. 1 shows input devices 119 and 118, but other input devices, such as speech recognition software and/or hardware could be used to input the selections and data for method 130.

In yet another embodiment, method 130 is stored in memory 184A of system 180A. Stored method 130 is transferred over network 104 to memory 111 in system 100. In this embodiment, network interface 183A and I/O interface 102 would include analog modems, digital modems, or a network interface card. If modems are used, network 104 includes a communications network, and method 130 is downloaded via the communications network.

Method 130 of the present invention may be implemented in a computer program including a comprehensive STAROFFICE office application that is available from Sun Microsystems, Inc. of Palo Alto, Calif. (STAROFFICE is a trademark of Sun Microsystems.) Such a computer program may be stored on any common data carrier like, for example, a floppy disk or a compact disc (CD), as well as on any common computer system's storage facilities like hard disks. Therefore, the present invention also relates to a data carrier for storing a computer program for carrying out the inventive method. The present invention also relates to a method for using a computer system for carrying out the presented inventive method. The present invention further relates to a computer system with a storage medium on which a computer program for carrying out the presented inventive method is stored.

While the present invention has been explained in connection with certain embodiments thereof, other embodiments will be apparent to those skilled in the art from consideration of the specification and practice of the invention disclosed therein. It is intended that the specification and examples be considered as exemplary only, without limiting the spirit and scope of the invention.

I claim:

1. A method for enabling access of a plurality of databases by a single access operation wherein each database in said plurality of databases requires a separate driver to access the database so that there is a plurality of separate drivers, said method comprising:

using an application programming interface (API) for each driver in said plurality of separate drivers, wherein said API is substantially identical for each of said drivers in said plurality of separate drivers;

receiving said single access operation by a merging driver wherein in response to said single access operation, said merging driver accesses each driver in said plurality of separate drivers through said API;

accessing an associated database in said plurality of databases by said each driver in response to said merging driver access through said API, wherein said single access operation enabled access of said plurality of databases; and said single access operation is performed for each of said plurality of databases to search for stored data related to said single access operation in each of said plurality of databases;

receiving a result offer from each of said plurality of databases having data available that is responsive to said single access operation; and obtaining, by said merging driver automatically without user action, an ordered result in response to said single access operation wherein said obtaining further comprises retrieving results, by said merging driver, corresponding to said result offers from said plurality of databases in an order to obtain said ordered result.

2. The method of claim 1 further comprising:

receiving from a user a selection of each database to be included in said plurality of databases.

3. The method of claim 2 wherein one database in said plurality of databases is a merging data source.

4. The method of claim 1 further comprising:

accessing said merging driver through a user interface API.

5. A computer program product comprising a computer memory having stored therein computer program code for enabling access of a plurality of databases by a single access operation wherein each database in said plurality of databases requires a separate driver to access the database so that there is a plurality of separate drivers, said method comprising:

using an application programming interface (API)for each driver in said plurality of separate drivers, wherein said API is substantially identical for each of said drivers in said plurality of separate drivers;

receiving said single access by a merging driver wherein in response to said single access operation, said merging driver accesses said plurality of separate drivers through said API; and accessing an associated database in said plurality of databases by said each driver in response to said merging driver access through said API, wherein said single access operation enabled access of said plurality of databases;

said single access operation is performed for each of said plurality of databases to search for stored data related to said single access operation in each of said plurality of databases;

receiving a result offer from each of said plurality of databases having data available that is responsive to said single access operation; and obtaining, by said merging driver automatically without user action, an ordered result in response to said single access operation wherein said obtaining further comprises retrieving results, by said merging driver, corresponding to said result offers from said plurality of databases in an order to obtain said ordered result.

6. The computer program product of claim 5 wherein said method further comprises:

receiving from a user a selection of each database to be included in said plurality of databases.

7. The computer program product of claim 6 wherein one database in said plurality of databases is a merging data source.

8. The computer program product of claim 5 wherein said method further comprises:

accessing said merging driver through a user interface API.

9. A system comprising:

a plurality of databases stored on at least one computer memory;

a driver for each database in said plurality of databases thereby forming a plurality of drivers wherein each driver has a substantially identical driver application programming interface; and a merging driver coupled to each driver in said plurality of drivers through said driver application programming interface wherein said merging driver distributes a single query to each driver in said plurality of drivers so that said single query is directed to each of said plurality of databases to search for stored data related to said single query in each of said plurality of databases;

said merging driver receives a result offer from each of said plurality of databases having data available that is responsive to said single access operation; and said merging driver generates, automatically without user action, an ordered result comprising retrieving results corresponding to said result offers from said plurality of databases in an order to generate said ordered result.

10. The system of claim 9 wherein one database in said plurality of databases is a merging data source.

11. A system comprising:

a processor; and a memory coupled to said processor, and having stored therein computer program instructions, wherein execution of computer program instructions by said processor comprises a method for enabling access of a plurality of databases by a single access operation wherein each database in said plurality of databases requires a separate driver to access the database so that there is a plurality of separate drivers, said method comprising:

using an application programming interface (API) for each driver in said plurality of separate drivers, wherein said API is substantially identical for each of said drivers in said plurality of separate drivers;

receiving said single access operation by a merging driver wherein in response to said single access operation, said merging driver accesses each driver in said plurality of separate drivers through said API;

accessing an associated database in said plurality of databases by said each driver in response to said merging driver access through said API, wherein said single access operation enabled access of said plurality of databases; and said single access operation is performed for each of said plurality of databases to search for stored data related to said single access operation in each of said plurality of databases;

receiving a result offer from each of said plurality of databases having data available that is responsive to said single access operation; and obtaining, by said merging driver automatically without user action, an ordered result in response to said single access operation wherein said obtaining further comprises retrieving results, by said merging driver, corresponding to said result offers from said plurality of databases in an order to obtain said ordered result.

12. The system of claim 11, said method further comprising:

receiving from a user a selection of each database to be included in said plurality of databases.

13. The system of claim 12 wherein one database in said plurality of databases is a merging data source.

14. The system of claim 11, said method further comprising:

accessing said merging driver through a user interface API.

* * * * *